Nov. 9, 1926. 1,605,981

F. F. PFEFFERKORN

HANDLE STRUCTURE

Filed Nov. 24, 1922

Inventor
Frederick F. Pfefferkorn
By Brockett, Hyde + Milburn
Attorneys

Patented Nov. 9, 1926.

1,605,981

UNITED STATES PATENT OFFICE.

FREDERICK F. PFEFFERKORN, OF CLEVELAND, OHIO, ASSIGNOR TO THE GEORGE H. BOWMAN COMPANY, OF CLEVELAND, OHIO, A CORPORATION OF OHIO.

HANDLE STRUCTURE.

Application filed November 24, 1922. Serial No. 602,985.

This invention relates to handle structures, and more particularly to handle structures especially adapted for use with cooking utensils and the like.

The object of the invention is to provide a handle structure of the class described, of simple and improved construction, which comprises a socket member adapted to be securely attached to a cooking utensil or the like, and a handle member adapted to be detachably and adjustably secured in said socket member, said socket and handle members being so constructed and arranged as to effectively prevent relative turning or rotary movement therebetween.

Further objects of the invention are in part obvious and in part will appear more in detail hereinafter.

Figure 1:
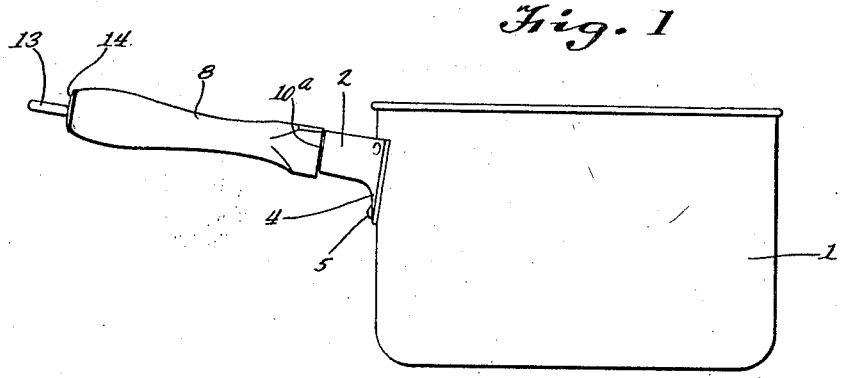
Figure 2:
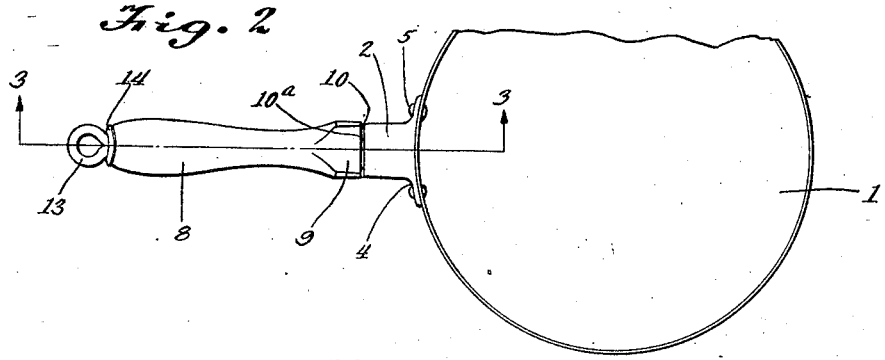
Figure 3:
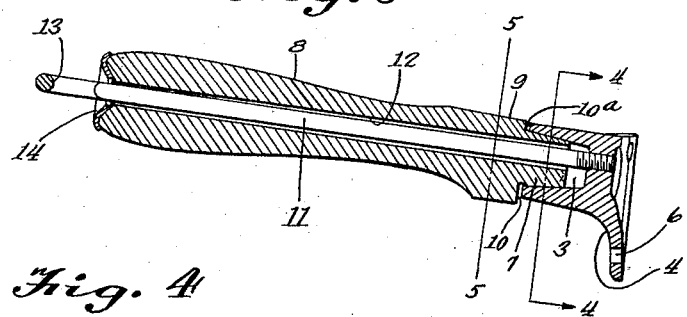
Figure 4:
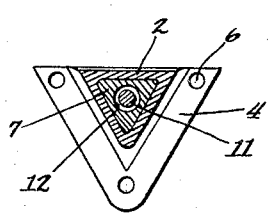
Figure 5:
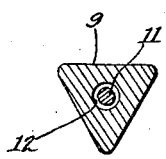

In the drawing, which represents one suitable embodiment of the invention, Fig. 1 is a side elevation of my improved handle structure suitably secured to a cooking utensil; Fig. 2 is a plan view thereof; Fig. 3 is a longitudinal sectional view of the handle structure, taken on the line 3—3, Fig. 2; and Figs. 4 and 5 are cross sectional views thereof, taken on the lines 4—4 and 5—5, Fig. 3, respectively.

Referring to the drawing, 1 represents a cooking utensil or vessel, such as a sauce pan, to the side of which the socket member of my improved handle structure is adapted to be securely attached. Said socket member may be made of any suitable material such as aluminum, and comprises a triangular body portion 2 having a correspondingly shaped, longitudinally extending opening 3, and an enlarged, integrally formed base portion 4, also triangular and preferably curved to conform to the cylindrical shape of the ordinary cooking utensil. The base portion 4 of said socket member may be secured to the sauce pan 1 by any suitable means, such as by rivets 5 passing through suitable apertures 6 in the corner portions of the base, this three point connection ensuring a firm and rigid attachment. Preferably, the body portion 2 of the socket member is not centrally disposed with respect to the base portion 4 thereof but is arranged at one side, as indicated in Fig. 4, and is also inclined thereto, so that when said base portion is secured to a cooking utensil, as in Fig. 1, the body portion of the socket member will extend slightly upwardly, as indicated, for convenience in handling the utensil.

In the opening 3 of said socket member is adapted to be inserted the reduced end portion 7 of handle member 8, which member may be made of any suitable material, preferably wood because of its low conductivity. End portion 7 of said handle member in cross section is of the same shape and substantially the same size as the cross section of socket opening 3, in which it is adapted to be secured, so that turning or rotary movement of said handle portion in said socket opening is effectively prevented. The body portion of said handle member may be of any suitable size and shape, the major portion thereof being here shown as substantially cylindrical with portion 9 adjacent shoulder 10 formed by reducing the inner end 7 shown as triangular to correspond to the triangular shape of the body portion 2 of the socket member.

The reduced end portion 7 of said handle member is detachably secured in the opening 3 of the socket member by a rod 11 extending through a longitudinally extending opening 12 in said handle member and having its inner end suitably threaded into the central portion of socket base 4. The outer end of said rod is formed into a ring 13 to enable the utensil to which the handle structure is secured to be readily and easily suspended from a hook or the like. An annular washer 14 is preferably provided between ring 11 and the outer end of the handle member 8 for the protection of the latter, as will be readily understood.

Thus said handle member is not only detachably secured in said socket member but may be adjusted therein to take up wear. Furthermore, socket opening 3 and the end portion 7 of the handle member are tapered, as indicated in Fig. 3, so that as the handle member is adjusted to take up wear the snug engagement of said end portion in said socket opening will be maintained.

It will, of course, be understood that when my improved handle structure is originally assembled, shoulder 10 does not engage the end of socket body portion 2, but a small space 10ª will be allowed for future adjustment.

It will thus be seen that I have provided a handle structure for cooking utensils and the like, in which the handle member is securely held in the socket member without turning or rotary movement relative thereto. Furthermore, said handle member is detachable, enabling it to be removed from one and applied to another like utensil and is adjustable to take up wear.

Other advantages of the invention will be apparent to those skilled in the art to which it relates.

Having described my invention, I claim:

1. In combination, a vessel provided with a socket portion having an outwardly tapering opening of non-circular shape in cross section, a handle member having an end portion engaging in said socket opening and terminating short of the inner end thereof, said handle end portion being of substantially the same cross sectional shape and size as said socket opening and having a taper corresponding to the taper of said socket opening, said handle end portion being of greater length than said socket opening, and an integral member extending through said handle member and adjustably secured to said socket portion for drawing together said socket portion and said handle member, whereby lost motion between said socket portion and said handle member may be readily taken up as it develops.

2. In combination, a vessel provided with a socket portion having an outwardly tapering opening of triangular shape in cross section, a handle member having an end portion engaging in said socket opening and terminating short of the inner end thereof, said handle end portion being of substantially the same cross sectional shape and size as said socket opening and having a taper corresponding to the taper of said socket opening, said handle end portion being of greater length than said socket opening, and an integral rod extending through said handle member and threaded to said socket portion for drawing together said socket portion and said handle member, whereby lost motion between said socket portion and said handle member may be readily taken up as it develops.

In testimony whereof I hereby affix my signature.

FREDERICK F. PFEFFERKORN.